(12) United States Patent
Becker et al.

(10) Patent No.: US 11,215,303 B2
(45) Date of Patent: Jan. 4, 2022

(54) PLASTICS PIPELINE WITH A SUPPORT SLEEVE

(71) Applicant: ContiTech MGW GmbH, Hannoversch Muenden (DE)

(72) Inventors: Viktor Becker, Goettingen (DE); Harald Kreidner, Hannoversch Muenden (DE); Hartmut Brill, Bad Sooden-Allendorf (DE)

(73) Assignee: ContiTech MGW GmbH, Muenden (DE)

(*) Notice: Subject to any disclaimer, the term of this patent is extended or adjusted under 35 U.S.C. 154(b) by 249 days.

(21) Appl. No.: 16/503,522

(22) Filed: Jul. 4, 2019

(65) Prior Publication Data
US 2020/0182386 A1 Jun. 11, 2020

(30) Foreign Application Priority Data
Dec. 7, 2018 (DE) .................. 10 2018 211 553.2

(51) Int. Cl.
*F16L 3/00* (2006.01)
*F16L 33/207* (2006.01)
(Continued)

(52) U.S. Cl.
CPC ............. *F16L 33/2071* (2013.01); *F16L 3/00* (2013.01); *F16L 3/01* (2013.01); *F16L 3/12* (2013.01);
(Continued)

(58) Field of Classification Search
CPC ... F16L 33/2071; F16L 21/005; F16L 21/007; F16L 21/00; F16L 3/1218; F16L 3/1222;
(Continued)

(56) References Cited

U.S. PATENT DOCUMENTS 2,260,454 A * 10/1941 Hedeman ................ F16L 33/22
285/242
3,891,250 A * 6/1975 Oetiker ............... F16L 33/2071
285/242
(Continued)

FOREIGN PATENT DOCUMENTS

DE 10331381 A1 3/2004
EP 1271036 A1 1/2003

*Primary Examiner* — Matthew Troutman
*Assistant Examiner* — James A Linford
(74) *Attorney, Agent, or Firm* — Gregory Adams; David L. Cate

(57) ABSTRACT

The invention relates to a plastics pipeline comprising at least one pipeline end (1) and at least one support ring (2). It was the underlying object of the invention to improve a plastics pipeline of the type described at the outset in such a way that the support sleeve or the support ring (2) remains firmly connected to the pipeline even in the event of the plastics pipeline being stored in the presence of high air humidity and temperature. This object is achieved by virtue of the fact that the blow molded pipe section (1) runs through the support ring (2) and, as viewed radially, is pressed from the inside outward against the support ring (2), wherein the pipe section (1) engages around the support ring (2), such that the support ring (2), with its outer surface, and the pipe section (1), with its outer surface, are substantially in alignment.

15 Claims, 2 Drawing Sheets

(51) Int. Cl.
*F16L 9/12* (2006.01)
*F16L 13/14* (2006.01)
*F16L 3/01* (2006.01)
*F16L 3/12* (2006.01)
*F16L 21/00* (2006.01)

(52) U.S. Cl.
CPC ............ *F16L 3/1218* (2013.01); *F16L 3/1222* (2013.01); *F16L 9/12* (2013.01); *F16L 13/143* (2013.01); *F16L 21/00* (2013.01); *F16L 21/005* (2013.01); *F16L 21/007* (2013.01)

(58) Field of Classification Search
CPC ....... F16L 3/01; F16L 3/00; F16L 3/12; F16L 9/12; F16L 13/143; F16L 13/147; F16L 25/0072; F16L 33/003; F16L 33/32
See application file for complete search history.

(56) References Cited

U.S. PATENT DOCUMENTS

| | | | | |
|---|---|---|---|---|
| 3,938,237 | A | * | 2/1976 | Dunz ...................... F16J 3/042 29/450 |
| 4,018,462 | A | * | 4/1977 | Saka ................... F16L 33/2071 285/111 |
| 6,155,302 | A | * | 12/2000 | Fischerkeller ..... F02M 37/0017 138/109 |

* cited by examiner

PLASTICS PIPELINE WITH A SUPPORT SLEEVE

The invention relates to a plastics pipeline comprising at least one blow molded pipe section and at least one support ring.

Pipelines made of plastic often represent an inexpensive and lightweight alternative to metal pipes. In this context, blow molded pipes, in particular, are of increasing importance, being used, for example, as boost air pipes in motor vehicles.

Since pipes of this kind are intrinsically rigid, it is often necessary to connect flexible elements, e.g. rubber hoses, to the ends of the pipes. A particularly simple and reliable connection between pipes and hoses comprises clamping the hoses firmly on the pipe ends by means of "clamping rings" or "crimp rings". Here, clamping is accomplished by pressing the clamping ring externally around the hose end piece pushed onto a pipe end by reducing the clamping ring diameter.

In order to ensure adequate leaktightness of this connection, there must be a certain minimum clamping force. In the case of plastics pipes, especially blow molded plastics pipes, there is the risk here that the plastics pipe end will be impermissibly deformed, making it impossible to achieve leaktightness. Support sleeves or support rings which can be inserted into the pipe end are therefore often used in the clamping zone.

EP 1 271 036 A1 shows a press-fitting for pipes which is of the type described. FIG. 3 of said document shows a support sleeve for the purpose of support, which is to be used when plastics pipes are employed. However, the axial position of the support sleeve is not defined here, and therefore errors may occur during assembly.

DE 103 31 381 A1 likewise discloses a press-fitting for pipes which is of this kind. For problem-free mounting of the support sleeve, said sleeve has a collar, which strikes against the end face of the pipe end when the support sleeve is pushed in and which is intended to ensure a reliable defined axial position of the support sleeve after pressure has been applied.

Common to both solutions however is the fact that the support sleeve adopts a fixed position only when pressure is applied to the joint.

Since plastics pipes absorb moisture when stored in an environment with a high air humidity and temperature and, as result, the inside diameter of the plastics pipes increases, there is therefore the risk that the support sleeves will fall out of the pipe ends. A remedy could be provided here by a certain preload, locking catches or a certain ribbing on the support sleeves. However, these elements could have a negative effect during clamping when pressed into the pipe inner surface in a corresponding way.

It was therefore the underlying object of the invention to improve a plastics pipeline of the type described at the outset in such a way that the support sleeve or the support ring remains firmly connected to the pipeline even in the event of the plastics pipeline being stored in the presence of high air humidity and temperature.

This object is achieved by virtue of the fact that the blow molded pipe section runs through the support ring and, as viewed radially, is pressed from the inside outward against the support ring, wherein the pipe section engages around the support ring, such that the support ring, with its outer surface, and the pipe section, with its outer surface, are substantially in alignment.

During blow molding, a parison for the pipeline can be introduced easily through the support ring inserted into the blow molding tool. During the blow molding process, the support ring can be fixed by the diameter of the pipe section, which increases from the inside outward during the blowing of the parison, on the pipeline section, which is then finished. The support ring thus has a defined position and cannot slip. By virtue of the fact that the pipe section engages around the support ring, the latter is situated in an annular recess of the pipe section and is therefore in immovable positive engagement in the axial direction. Since the surfaces of the support ring and of the pipe section are substantially in alignment, there is also no risk that a hose will be damaged as it is compressed on the pipeline. The risk of leaks is also reduced thereby.

In a development of the invention, the support ring has chamfers, which, as viewed radially, are arranged on the outside and, as viewed axially, are arranged on both sides on the support ring.

During the blow molding process, the pipeline can be pressed from the inside outward into the spaces formed by the chamfers between the blow molding tool and the support ring, giving even better positive engagement between the pipeline and the support ring.

An example of the invention is explained in more detail below on the basis of the drawing. In the drawing.

Figure 1:
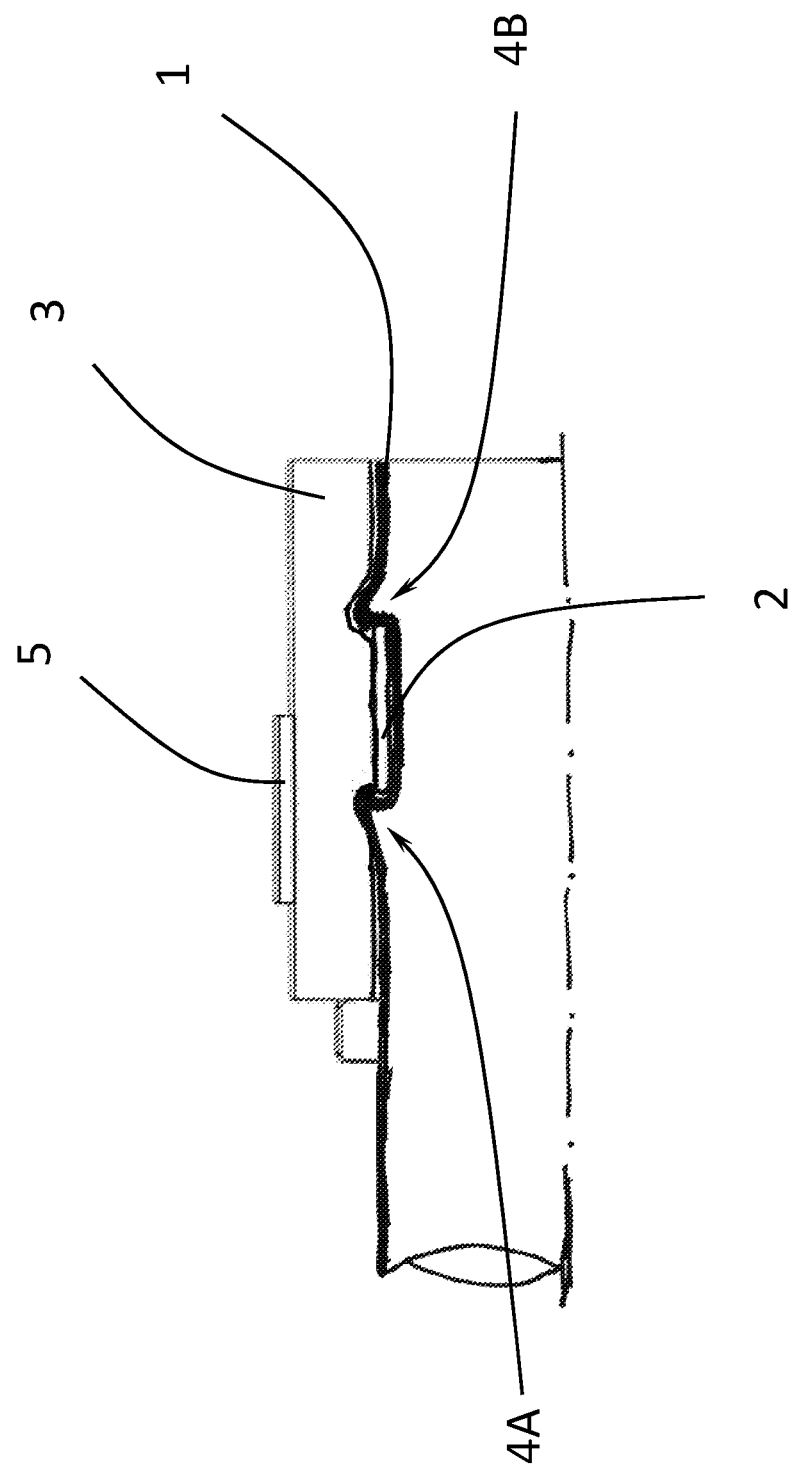
FIG. 1 shows a pipeline according to the invention with a support ring.

FIG. 1 shows part of a plastics pipeline according to the invention with a pipeline end 1. A support ring 2 is arranged on the pipeline end 1. An elastomer hose 3, of which only a partial section is shown here, is pushed onto the pipeline end 1 with the support ring 2. The pipeline end 1 is designed as a plastics blow molding, wherein the pipeline end 1 runs through the support ring 2 and is molded around the support ring 2 by means of the blow molding process in such a way that two undercuts 4A and 4B are formed, which extend partially around the support ring 2.

Even if the pipeline end 1 was stored in the presence of a relatively high air humidity and high temperature, reliable and firm seating of the support ring 2 on the pipeline end 1 is ensured despite the associated expansion and subsequent shrinkage of the pipeline end 1.

The elastomer hose 3 is clamped firmly on the pipeline end 1 by means of a clamping ring 5. In this arrangement, at least one undercut region, in this case 4A, can be clamped firmly between the clamping ring 2 and the elastomer hose 3, and therefore a high level of security for the leaktightness of the connection between the elastomer hose 3 and the pipeline end 1 is provided.

Figure 2:
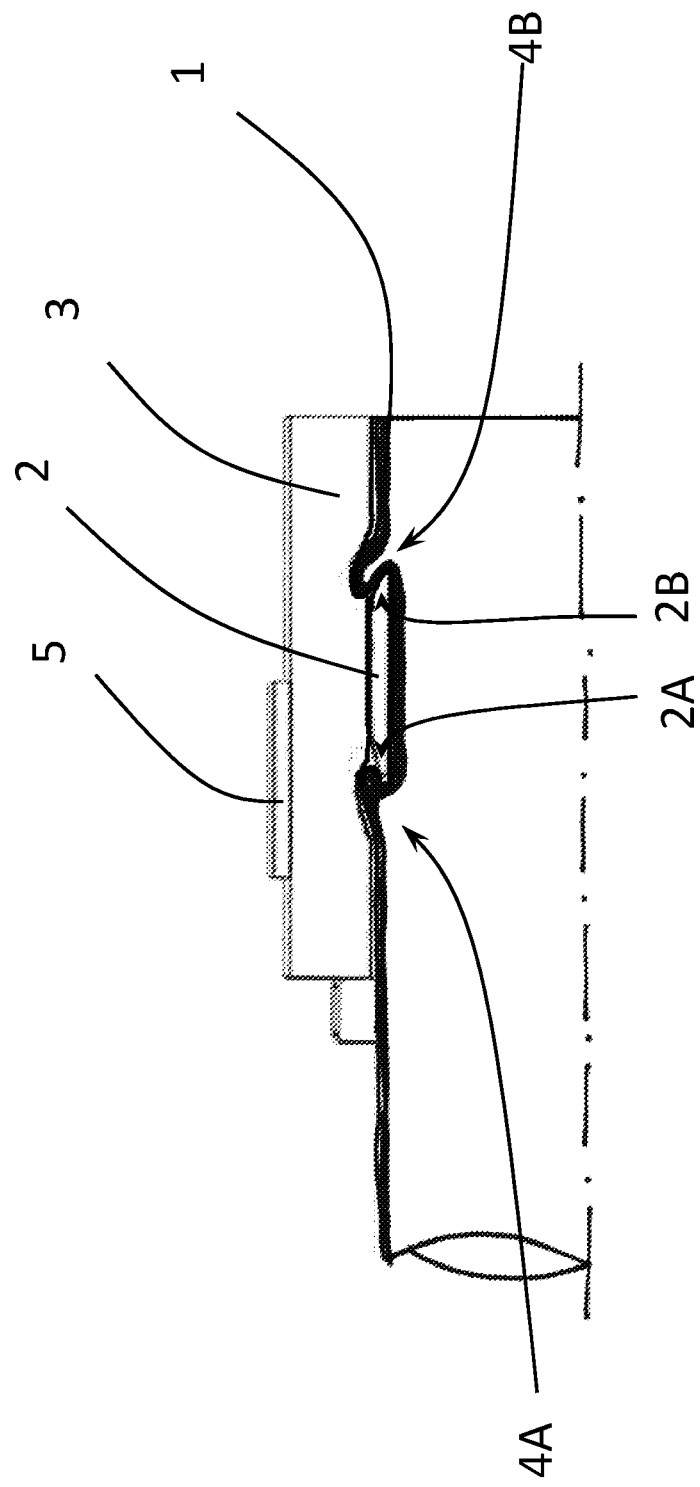
FIG. 2 shows the pipeline according to the invention with a support ring that has a chamfer.

FIG. 2 shows essentially the same arrangement as FIG. 1. Here, the support ring 2 additionally has 2 chamfers 2A and 2B, which are arranged radially on the outside and axially on both sides of the support ring 2.

The chamfers 2A and 2B facilitate the molding of the undercuts 4A and 4B during the blow molding of the pipeline end 1, thus ensuring even better anchoring of the support ring 2 on the pipeline end 1.

LIST OF REFERENCE SIGNS

Part of the Description

1 Pipeline end
2 Support ring

2A, 2B Chamfers of the support ring 2
3 Elastomer hose
4A, 4B Undercuts
5 Clamping ring

The invention claimed is:

1. A plastics pipeline comprising at least one pipeline end and at least one support ring, wherein each of the at least one pipeline end comprises a blow molded pipe section which runs through the at least one support ring, wherein the blow molded pipe section engages around the at least one support ring, such that the at least one support ring, with its outer surface, and the blow molded pipe section, with its outer surface, are in alignment;

an elastomer hose is disposed upon the at least one pipeline end and the at least one support ring;

the elastomer hose is clamped upon the at least one pipeline end with a clamping ring; and the at least one pipeline end comprises opposing chamfers which extend partially around the at least one support ring, and wherein the elastomer hose is clamped upon the at least one pipeline end and over at least one chamfer.

2. The plastics pipeline as claimed in claim 1, wherein the at least one support ring comprises chamfers, which, as viewed radially, are arranged on the outside and, as viewed axially, are arranged on both sides on the at least one support ring.

3. The plastics pipeline as claimed in claim 1, wherein the plastics pipeline is leaktight.

4. The plastics pipeline as claimed in claim 1, wherein the at least one support ring is disposed around a parison for forming the at least one pipeline end.

5. The plastics pipeline as claimed in claim 4, wherein the at least one support ring has a defined position upon the at least one pipeline end.

6. The plastics pipeline as claimed in claim 1, wherein the at least one pipeline end comprises an annular recess, and wherein the at least one support ring is situated in the annular recess in an immovable positive engagement in an axial direction.

7. The plastics pipeline as claimed in claim 1, wherein the elastomer hose is compressed upon the at least one pipeline end and the at least one support ring, and wherein the elastomer hose is undamaged.

8. The plastics pipeline as claimed in claim 1, wherein the at least one pipeline end comprises opposing undercuts which extend partially around the at least one support ring, and wherein the elastomer hose is clamped upon the at least one pipeline end and over at least one undercut.

9. The plastics pipeline as claimed in claim 8, wherein the elastomer hose is clamped upon the at least one pipeline end in a leaktight manner.

10. The plastics pipeline as claimed in claim 1, wherein the elastomer hose is clamped upon the at least one pipeline end in a leaktight manner.

11. The plastics pipeline as claimed in claim 1, wherein the at least one pipeline end comprises opposing undercuts which extend partially around the at least one support ring.

12. A plastics pipeline comprising:

at least one pipeline end and at least one support ring, each of the at least one pipeline end comprises a blow molded pipe section which runs through the at least one support ring, the blow molded pipe section engages around the at least one support ring, such that the at least one support ring, with its outer surface, and the blow molded pipe section, with its outer surface, are in alignment;

an elastomer hose is disposed upon the at least one pipeline end and the at least one support ring; and the at least one pipeline end comprises opposing chamfers which extend partially around the at least one support ring, and wherein the elastomer hose is clamped upon the at least one pipeline end and over at least one chamfer.

13. The plastics pipeline as claimed in claim 12, wherein the at least one support ring comprises chamfers, which, as viewed radially, are arranged on the outside and, as viewed axially, are arranged on both sides on the at least one support ring.

14. The plastics pipeline as claimed in claim 12, wherein the plastics pipeline is leaktight.

15. The plastics pipeline as claimed in claim 12, wherein the at least one support ring is disposed around a parison for forming the at least one pipeline end.

* * * * *